United States Patent
Behzad et al.

(10) Patent No.: US 8,180,311 B2
(45) Date of Patent: *May 15, 2012

(54) LOCAL OSCILLATION ROUTING PLAN APPLICABLE TO A MULTIPLE RF BAND RF MIMO TRANSCEIVER

(75) Inventors: Arya Reza Behzad, Poway, CA (US); Hooman Darabi, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 1073 days.

This patent is subject to a terminal disclaimer.

(21) Appl. No.: 12/049,771

(22) Filed: Mar. 17, 2008

(65) Prior Publication Data

US 2008/0304435 A1    Dec. 11, 2008

Related U.S. Application Data

(63) Continuation of application No. 11/173,043, filed on Jul. 1, 2005, now Pat. No. 7,356,325.

(60) Provisional application No. 60/668,050, filed on Apr. 4, 2005.

(51) Int. Cl.
*H04B 1/26* (2006.01)
*H04B 1/28* (2006.01)
*H04M 1/00* (2006.01)

(52) U.S. Cl. ............... 455/323; 455/333; 455/552.1; 455/561

(58) Field of Classification Search ............ 455/41.1, 455/41.2, 73, 313, 323, 333, 334, 552.1, 455/560, 561, 562.1; 370/901, 908
See application file for complete search history.

(56) References Cited

U.S. PATENT DOCUMENTS

| 5,966,666 A * | 10/1999 | Yamaguchi et al. | 455/552.1 |
| 6,728,517 B2 * | 4/2004 | Sugar et al. | 455/73 |
| 7,499,684 B2 * | 3/2009 | Cavin | 455/141 |

* cited by examiner

*Primary Examiner* — Quochien B Vuong
(74) *Attorney, Agent, or Firm* — Garlick & Markison; Kevin L. Smith

(57) ABSTRACT

Local oscillation circuitry for use in an RF transceiver Integrated Circuit (IC) includes local oscillation generation circuitry operable to produce a local oscillation and local oscillation distribution circuitry. The local oscillation distribution circuitry includes a splitting circuit, a first distribution portion, and a second distribution portion. The splitting circuit receives the local oscillation and produces multiple copies of the local oscillation. The first distribution portion produces a first local oscillation corresponding to a first RF band and a second local oscillation corresponding to a second RF band based and to provide the first local oscillation and the second local oscillation to a first RF transceiver group. The second distribution portion produces a first local oscillation and a second local oscillation and provides the first local oscillation and the second local oscillation to the second RF transceiver group.

19 Claims, 10 Drawing Sheets

LOCAL OSCILLATION ROUTING PLAN APPLICABLE TO A MULTIPLE RF BAND RF MIMO TRANSCEIVER

CROSS REFERENCES TO RELATED APPLICATIONS

The present U.S. Utility Patent Application claims priority pursuant to 35 U.S.C. §120, as a continuation, to the following U.S. Utility Patent Application which is hereby incorporated herein by reference in its entirety and made part of the present U.S. Utility Patent Application for all purposes:

1. U.S. Utility application Ser. No. 11/173,043, entitled "LOCAL OSCILLATION ROUTING PLAN APPLICABLE TO A MULTIPLE RF BAND RF MIMO TRANSCEIVER," filed Jul. 1, 2005, now issued as U.S. Pat. No. 7,356,325, on Apr. 8, 2008, which claims priority pursuant to 35 U.S.C. §119(e) to the following U.S. Provisional Patent Application which is hereby incorporated herein by reference in its entirety and made part of the present U.S. Utility Patent Application for all purposes:

a. U.S. Provisional Application Ser. No. 60/668,050, entitled "LOCAL OSCILLATION ROUTING PLAN IN A MULTIPLE RF BAND RF TRANSCEIVER," filed Apr. 4, 2005.

BACKGROUND OF THE INVENTION

1. Technical Field of the Invention

This invention relates generally to communication circuitry and more particularly to radio frequency integrated circuits that may be used within a wireless communication device.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11 (Wireless Local Area Networks "WLANs"), Bluetooth (Wireless Personal Area Networks), advanced mobile phone services (AMPS), digital AMPS, global system for mobile communications (GSM), code division multiple access (CDMA), time division multiple access (TDMA), frequency division multiple access (FDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

As is also known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

In many wireless communication systems, it is desirable to operate in multiple RF bands. For example, the IEEE 802.11 covers operations in both the 2.4 GHz band and the 5 GHz band. Requirements for such operation call for operating in different of these RF bands closely in time. Thus, an RF transceiver supporting such operations must be able to transition from one of these bands to another in short order. Constructing an RF transceiver to support multiple RF band operations is a difficult task from many perspectives. Currently developing operating standards will require Multiple Input Multiple Output (MIMO) operations in which multiple receivers or transmitters of an RF transceiver operate simultaneously in a common band. Therefore, a need exists for improvements in the construct of multiple RF band transceivers.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

Figure 1:
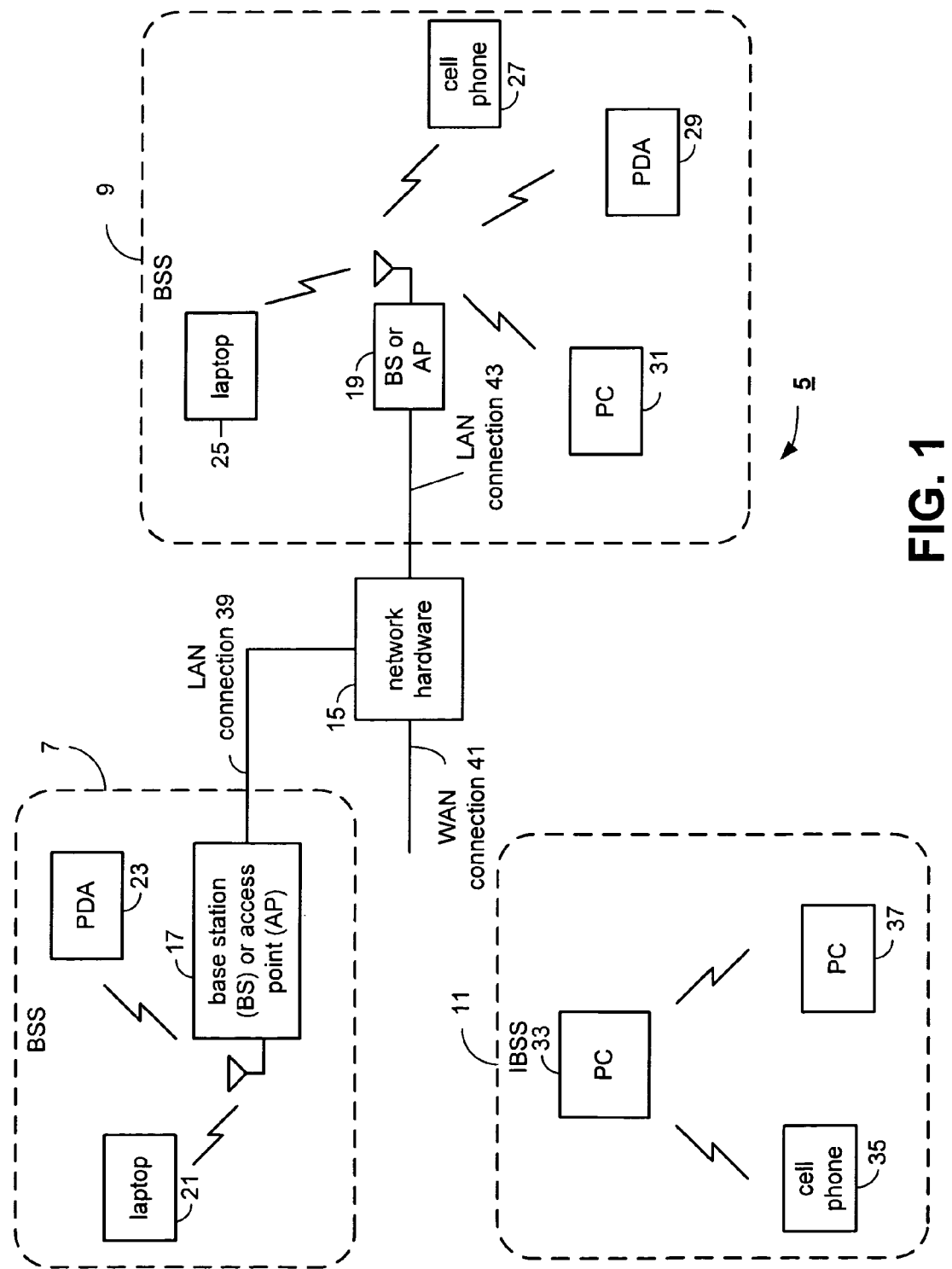
FIG. 1 is a schematic block diagram illustrating a wireless communication system in accordance with the present invention.

FIG. 1 is a schematic block diagram illustrating a communication system 5 that includes basic service set (BSS) areas 7 and 9, an independent basic service set (IBSS) 11, and a network hardware device 15. Each of the BSS areas 7 and 9 include a base station and/or access point 17, 19 and a plurality of wireless communication devices 21-23, 25-31. The IBSS 11 includes a plurality of wireless communication devices 33-37. Each of the wireless communication devices 21-37 may be laptop host computers 21 and 25, personal digital assistant hosts 23 and 29, personal computer hosts 31 and 33, and/or cellular telephone hosts 27 and 35.

The base stations or access points 17 and 19 are operably coupled to the network hardware 15 via local area network connections 39 and 43. The network hardware 15, which may be a router, switch, bridge, modem, system controller, et cetera, provides a wide area network connection 41 for the communication system 5. Each of the base stations or access points 17, 19 has an associated antenna or antenna array to communicate with the wireless communication devices in its area. Typically, the wireless communication devices register with a particular base station or access point 17, 19 to receive services from the communication system 5. For direct connections (i.e., point-to-point communications) within IBSS 11, wireless communication devices 33-37 communicate directly via an allocated channel.

Typically, base stations are used for cellular telephone systems and like-type systems, while access points are used for in-home or in-building wireless networks. Regardless of the particular type of communication system, each wireless communication device includes a built-in radio transceiver and/or is coupled to a radio transceiver to facilitate direct and/or in-direct wireless communications within the communication system 5.

Figure 2:
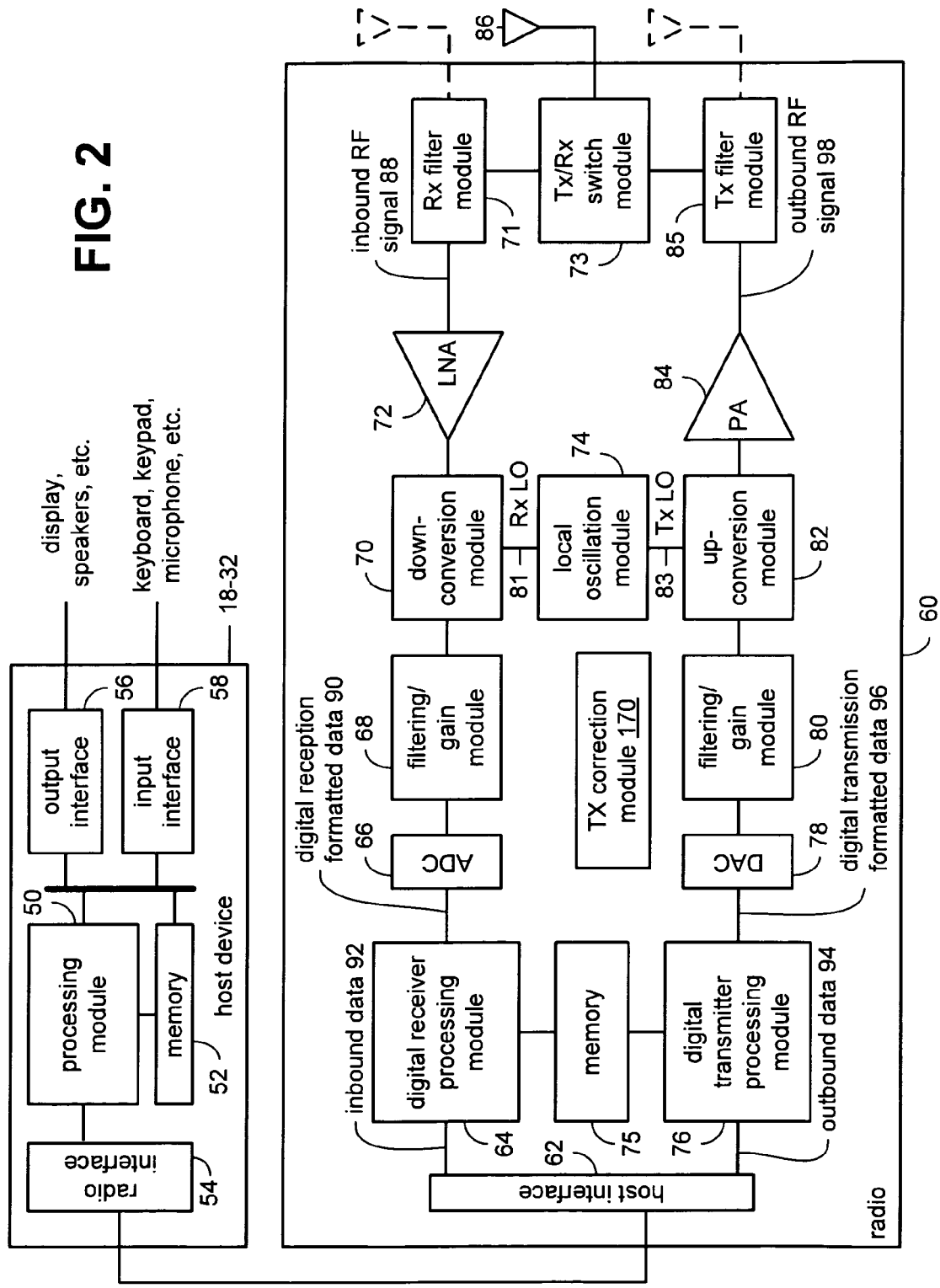
FIG. 2 is a schematic block diagram illustrating a wireless communication device in accordance with the present invention.

FIG. 2 is a schematic block diagram illustrating a wireless communication device that includes a host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes at least a processing module 50, memory 52, radio interface 54, input interface 58, and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, digital receiver processing module 64, analog-to-digital converter 66, filtering/gain module 68, down conversion module 70, low noise amplifier 72, local oscillation module 74, memory 75, digital transmitter processing module 76, digital-to-analog converter 78, filtering/gain module 80, up-conversion module 82, power amplifier 84, and an antenna 86. The antenna 86 may be a single antenna that is shared by the transmit and receive paths or may include separate antennas for the transmit path and receive path. The antenna implementation will depend on the particular standard to which the wireless communication device is compliant.

The digital receiver processing module 64 and the digital transmitter processing module 76, in combination with operational instructions stored in memory 75, execute digital receiver functions and digital transmitter functions, respectively. The digital receiver functions include, but are not limited to, digital intermediate frequency to baseband conversion, demodulation, constellation demapping, decoding, and/or descrambling. The digital transmitter functions include, but are not limited to, scrambling, encoding, constellation mapping, modulation, and/or digital baseband to IF conversion. The digital receiver and transmitter processing modules 64 and 76 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 and/or 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The host interface 62 routes the outbound data 94 to the digital transmitter processing module 76, which processes the outbound data 94 in accordance with a particular wireless communication standard (e.g., IEEE802.11a, IEEE802.11b, IEEE 802.11g, IEEE 802.11n, IEEE 802.15, Bluetooth, et cetera) to produce digital transmission formatted data 96. The digital transmission formatted data 96 will be a digital base-band signal or a digital low IF signal, where the low IF will be in the frequency range of zero to a few megahertz.

The digital-to-analog converter 78 converts the digital transmission formatted data 96 from the digital domain to the analog domain. The filtering/gain module 80 filters and/or adjusts the gain of the analog signal prior to providing it to the up-conversion module 82. The up-conversion module 82 directly converts the analog baseband or low IF signal into an RF signal based on a transmitter local oscillation provided by local oscillation module 74. The power amplifier 84 amplifies the RF signal to produce outbound RF signal 98. The antenna 86 transmits the outbound RF signal 98 to a targeted device such as a base station, an access point, and/or another wireless communication device.

The radio 60 also receives an inbound RF signal 88 via the antenna 86, which was transmitted by a base station, an access point, or another wireless communication device. The antenna 86 provides the inbound RF signal 88 to the low noise amplifier 72, which amplifies the signal 88 to produce an amplified inbound RF signal. The low noise amplifier 72 provide the amplified inbound RF signal to the down conversion module 70, which directly converts the amplified inbound RF signal into an inbound low IF signal (or baseband signal) based on a receiver local oscillation provided by local oscillation module 74. The down conversion module 70 provides the inbound low IF signal (or baseband signal) to the filtering/gain module 68, which filters and/or adjusts the gain of the signal before providing it to the analog to digital converter 66.

The analog-to-digital converter 66 converts the filtered inbound low IF signal (or baseband signal) from the analog domain to the digital domain to produce digital reception formatted data 90. The digital receiver processing module 64 decodes, descrambles, demaps, and/or demodulates the digital reception formatted data 90 to recapture inbound data 92 in accordance with the particular wireless communication standard being implemented by radio 60. The host interface 62 provides the recaptured inbound data 92 to the host device 18-32 via the radio interface 54.

Figure 3:
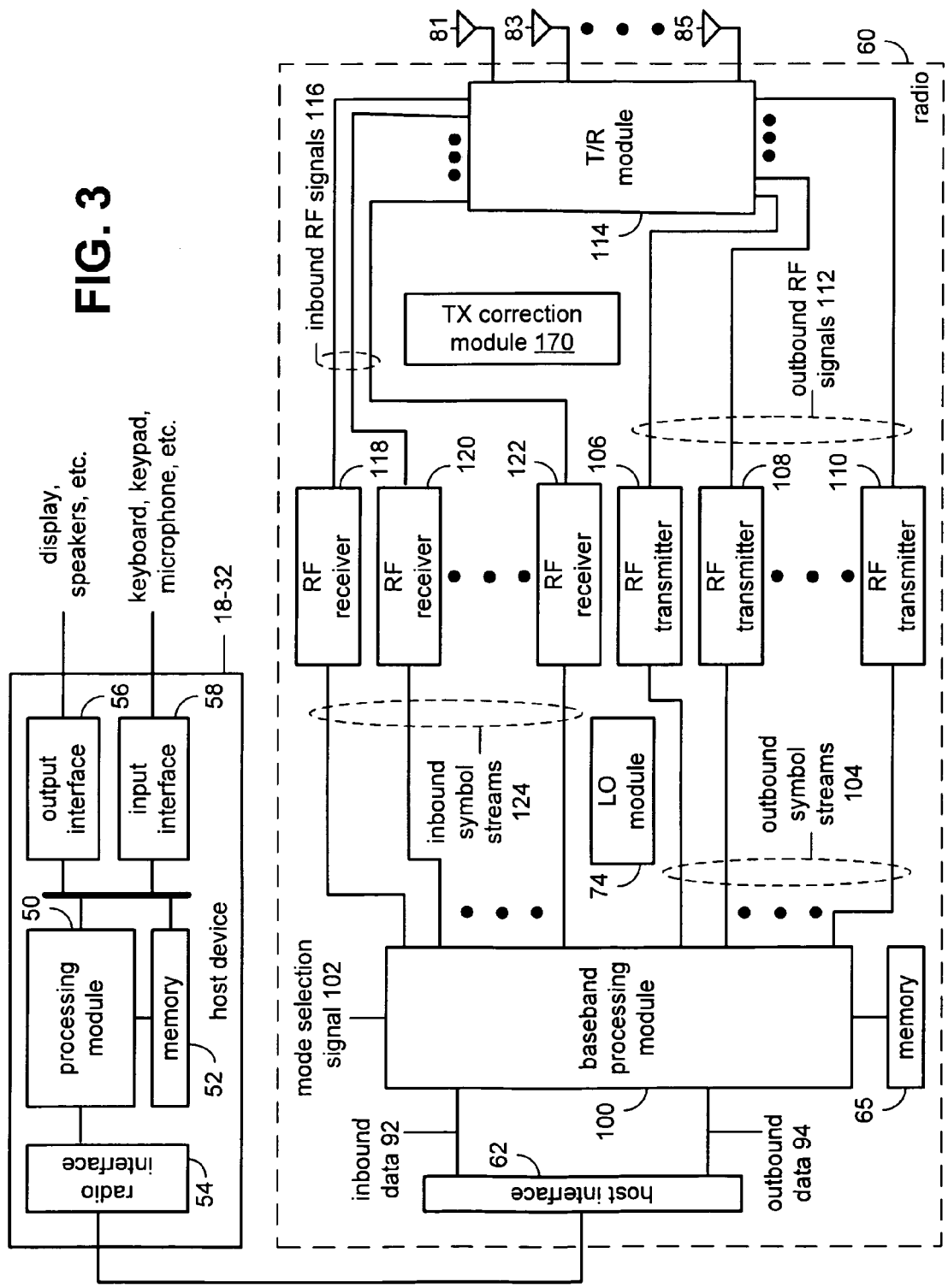
FIG. 3 is a schematic block diagram illustrating another wireless communication device in accordance with the present invention.

FIG. 3 is a schematic block diagram illustrating a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, radio interface 54, input interface 58, and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 100, memory 65, a plurality of radio frequency (RF) transmitters 106-110, a transmit/receive (T/R) module 114, a plurality of antennas 81-85, a plurality of RF receivers 118-120, a channel bandwidth adjust module 87, and a local oscillation module 74. The baseband processing module 100, in combination with operational instructions stored in memory 65, executes digital receiver functions and digital transmitter functions, respectively. The digital receiver functions may include, but are not limited to, digital intermediate frequency to baseband conversion, demodulation, constellation demapping, decoding, de-interleaving, fast Fourier transform, cyclic prefix removal, space, and time decoding, and/or descrambling. The digital transmitter functions include, but are not limited to, scrambling, encoding, interleaving, constellation mapping, modulation, inverse fast Fourier transform, cyclic prefix addition, space and time encoding, and digital baseband to IF conversion. The baseband processing modules 100 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 65 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 100 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The baseband processing module 64 receives the outbound data 88 and, based on a mode selection signal 102, produces one or more outbound symbol streams 90. The mode selection signal 102 will indicate a particular mode of operation that is compliant with one or more specific modes of the various IEEE 802.11 standards. For example, the mode selection signal 102 may indicate a frequency band of 2.4 GHz, a channel bandwidth of 20 or 22 MHz and a maximum bit rate of 54 megabits-per-second. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM, and/or 64 QAM. The mode select signal 102 may also include a code rate, a number of coded bits per subcarrier (NBPSC), coded bits per OFDM symbol (NCBPS), and/or data bits per OFDM symbol (NDBPS). The mode selection signal 102 may also indicate a particular channelization for the corresponding mode that provides a channel number and corresponding center frequency. The mode select signal 102 may further indicate a power spectral density mask value and a number of antennas to be initially used for a MIMO communication.

The baseband processing module 100, based on the mode selection signal 102 produces one or more outbound symbol streams 104 from the outbound data 94. For example, if the mode selection signal 102 indicates that a single transmit antenna is being utilized for the particular mode that has been selected, the baseband processing module 100 will produce a single outbound symbol stream 104. Alternatively, if the mode select signal 102 indicates 2, 3, or 4 antennas, the baseband processing module 100 will produce 2, 3, or 4 outbound symbol streams 104 from the outbound data 94.

Depending on the number of outbound streams 104 produced by the baseband module 10, a corresponding number of the RF transmitters 106-110 will be enabled to convert the outbound symbol streams 104 into outbound RF signals 112. In general, each of the RF transmitters 106-110 includes a digital filter and upsampling module, a digital to analog conversion module, an analog filter module, a frequency up conversion module, a power amplifier, and a radio frequency bandpass filter. The RF transmitters 106-110 provide the outbound RF signals 112 to the transmit/receive module 114, which provides each outbound RF signal to a corresponding antenna 81-85.

When the radio 60 is in the receive mode, the transmit/receive module 114 receives one or more inbound RF signals 116 via the antennas 81-85 and provides them to one or more RF receivers 118-122. The RF receiver 118-122, based on settings provided by the channel bandwidth adjust module 87, converts the inbound RF signals 116 into a corresponding number of inbound symbol streams 124. The number of inbound symbol streams 124 will correspond to the particular mode in which the data was received. The baseband processing module 100 converts the inbound symbol streams 124 into inbound data 92, which is provided to the host device 18-32 via the host interface 62.

As one of average skill in the art will appreciate, the wireless communication device of FIG. 3 may be implemented using one or more integrated circuits. For example, the host device may be implemented on one integrated circuit, the baseband processing module 100 and memory 65 may be implemented on a second integrated circuit, and the remaining components of the radio 60, less the antennas 81-85, may be implemented on a third integrated circuit. As an alternate example, the radio 60 may be implemented on a single integrated circuit. As yet another example, the processing module 50 of the host device and the baseband processing module 100 may be a common processing device implemented on a single integrated circuit. Further, the memory 52 and memory 65 may be implemented on a single integrated circuit and/or on the same integrated circuit as the common processing modules of processing module 50 and the baseband processing module 100.

Figure 4:
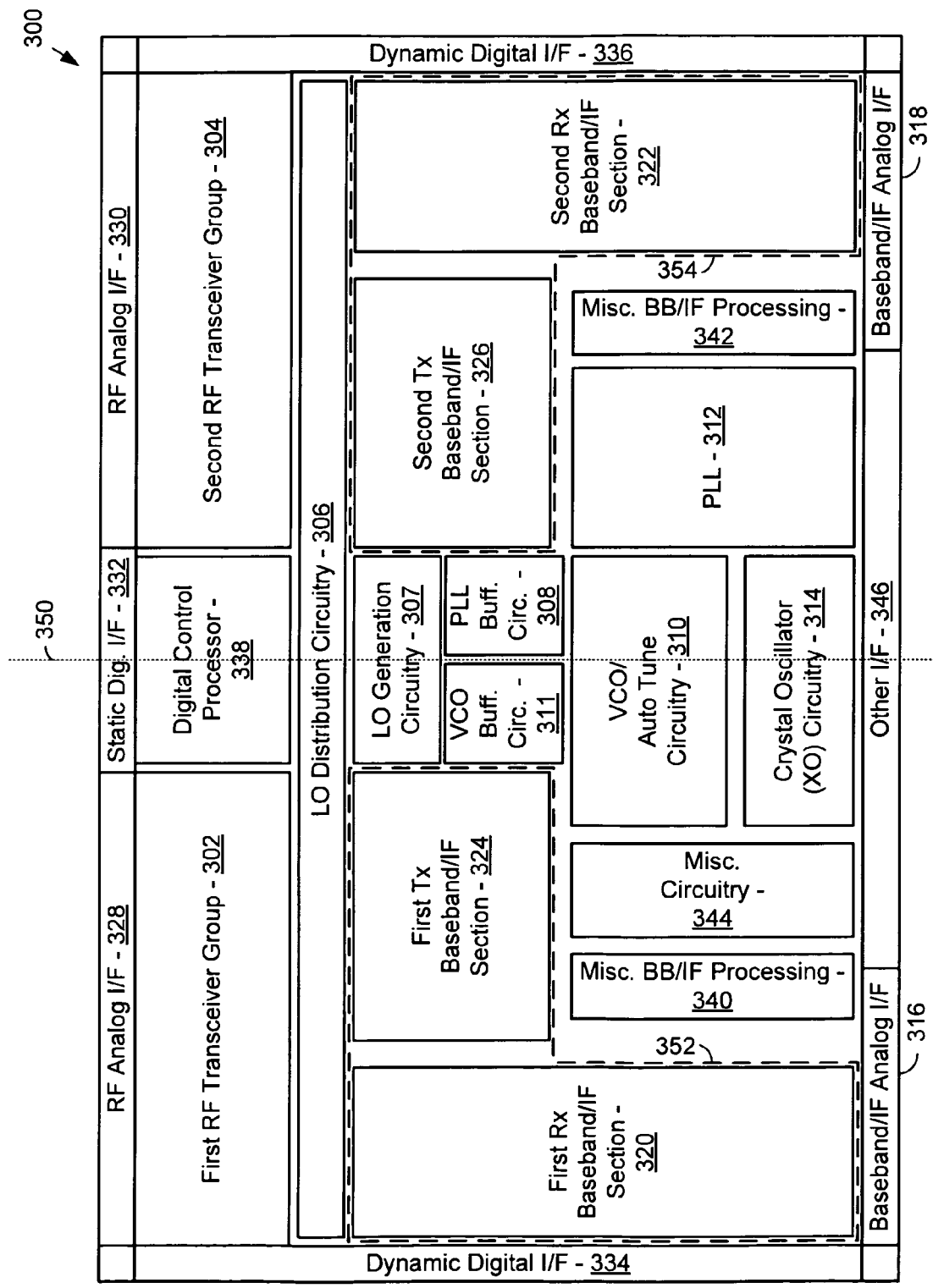
FIG. 4 is a schematic block diagram illustrating a Radio Frequency (RF) transceiver Integrated Circuit (IC) in accordance with the present invention.

FIG. 4 is a schematic block diagram illustrating a Radio Frequency (RF) transceiver Integrated Circuit (IC) in accordance with the present invention. The RF transceiver IC 300 includes a first transceiver group 302, a second transceiver group 304, a first baseband section 352, a second baseband section 354, local oscillation generation circuitry 307, and local oscillation distribution circuitry 306. Additional components of the RF transceiver IC 300 will be described subsequently herein.

The first baseband section 352 communicatively couples to the first RF transceiver group 302. Further, the second baseband section 354 communicatively couples to the second RF transceiver group 304. The local oscillation generation circuitry 307 generates a local oscillation and couples the local oscillation to the local oscillation distribution circuitry 306. The local oscillation distribution circuitry 306 operably couples to the local oscillation generation circuitry 307, to the first RF transceiver group 302, and to the second RF transceiver group 304.

According to a first aspect to the present invention, the second RF transceiver group 304 resides in substantial symmetry with the first RF transceiver group 302 about a center line of symmetry 350 of the RF transceiver IC 300. As the reader will appreciate, the center line of symmetry 350 of the RF transceiver IC 300 is not formed upon the RF transceiver IC 300 but relates to the layout of the components of the RF transceiver IC 300. Further, the center line of symmetry 350 of the RF transceiver IC 300 relates to the substantial but not absolute symmetrical relationship of the components. Thus, while the first RF transceiver group 302 and the second RF transceiver group 304 reside in substantial symmetry with one another about the center line of symmetry 350 of the RF transceiver IC 300, such symmetry may not be absolute or precise but merely substantial. Moreover, the center line of symmetry 350 of the RF transceiver IC 300 relates to the symmetrical relationship of components of the RF transceiver IC 300 and need not reside in a central location of the RF transceiver IC 300.

The first baseband section 352 includes a first Rx baseband section 320 and a first Tx baseband section 324. Further, the second baseband section 354 includes a second Rx baseband section 322 and a second Tx baseband section 326. According to another aspect of the present invention, the second baseband section 354 resides in substantial symmetry with the first baseband section 352 about the center line of symmetry 350 of the RF transceiver IC 300. As was the case with the symmetry of the first RF transceiver group 302 with respect to the second RF transceiver group 304, the symmetry of the baseband section 352 and 354 according to the present invention is substantial but may not be absolute or precise. According to another aspect to this symmetry, the first Tx baseband section 324 may reside in substantial symmetry with relation to the second Tx baseband section 326 about the center line of symmetry 350 of the RF transceiver IC 300. Further, the first Rx baseband section 320 and the second Rx baseband section 322 may reside in substantial symmetry with each other about the center line of symmetry 350 of the RF transceiver IC.

As is apparent upon review of FIG. 4, additional symmetrical and spatial relationships exist among the functional blocks of the RF transceiver IC 300. For example, the local oscillation generation circuitry 307 resides substantially along the center line of symmetry 350 of the RF transceiver IC 300. Such location of the local oscillation generation circuitry 307 in conjunction with the structure of the LO distribution circuitry 306 facilitates a uniform distribution of local oscillation signals to the first RF transceiver group 302 and to the second RF transceiver group 304. When the RF transceiver IC 300 supports Multiple Input Multiple Output (MIMO) communications, the timing and phase alignment of the RF signals produced by the first RF transceiver group 302 and the second RF transceiver group 304 is of enhanced importance. Thus, with the structure of the LO distribution circuitry 306 about the center line of symmetry 350 of the RF transceiver IC 300, distribution of precisely phase aligned local oscillations is supported.

The additional components of the RF transceiver IC 300 include a Phase Locked Loop (PLL) 312, PLL buffering circuitry 308, voltage controlled oscillator (VCO)/auto tune circuitry 310, VCO buffering circuitry 311, and crystal oscillator circuitry 314. The VCO/auto tune circuitry 310 and the crystal oscillator circuitry 314 operate in conjunction with the PLL 312 to produce inputs to PLL buffering circuitry 308 and the VCO buffering circuitry. The VCO buffering circuitry 311 provides input to the LO generation circuitry while the PLL buffering circuitry 308 provides an input to the PLL 312. The structure and operation of circuitry for generating a local oscillation apart from the teachings of the present invention is generally known and will not be described further herein.

The RF transceiver IC 300 further includes a digital control processor 338, miscellaneous baseband/IF processing 340, miscellaneous circuitry 344, miscellaneous baseband IF processing 342 and various input and output structures. As the reader will appreciate, the functional block diagram of FIG. 4 does not explicitly show connections between the various functional blocks of the RF transceiver IC 300. Based upon the function and operation of each of these functional blocks, each of the functional blocks will be coupled to various other of the functional blocks to support transmittal of communication signals, control signals, power, and ground between the various functional blocks. As the reader will appreciate, the connectivity between this various blocks is straight forward and needs no further description herein.

The RF transceiver IC 300 includes a static digital interface 332 that resides along an edge of the RF transceiver IC 300 that is substantially perpendicular to the center line of symmetry 350 of the RF transceiver IC 300. The RF transceiver IC 300 further includes a first dynamic digital interface 334 residing along a first edge of the RF transceiver IC 300 that is substantially parallel to the center line of symmetry 350 of the RF transceiver IC 300. Further, the RF transceiver IC 300 includes a second dynamic digital interface 336 residing along a second edge of the RF transceiver IC 300 that is substantially parallel to the center line of symmetry 350 of the RF transceiver IC 300. The digital control processor 338 communicatively couples to the static digital interface 332 and also resides along the center line of symmetry 350 of the RF transceiver IC 300 according to one aspect of the present invention.

The RF transceiver IC 300 includes a first baseband analog interface 316 that communicatively couples to the first baseband section 352 and resides along a first edge of the RF transceiver IC 300 oriented substantially perpendicular to the center line of symmetry 350 of the RF transceiver IC 300. The RF transceiver IC 300 further includes a second baseband analog interface 318 that communicatively couples to the second baseband section 354 and resides along the first edge of the RF transceiver IC 300. Moreover, the RF transceiver IC 300 includes a first RF analog interface 328 that communicatively couples to the first transceiver group 302 and resides along a second edge of the RF transceiver IC 300 oriented substantially perpendicular to the center line of symmetry 350 of the RF transceiver IC 300. The second edge resides opposite the first edge. Finally, the RF transceiver IC 300 includes a second analog interface 330 that communicatively couples to the second transceiver group 304 and resides along the second edge of the RF transceiver IC.

Figure 5:
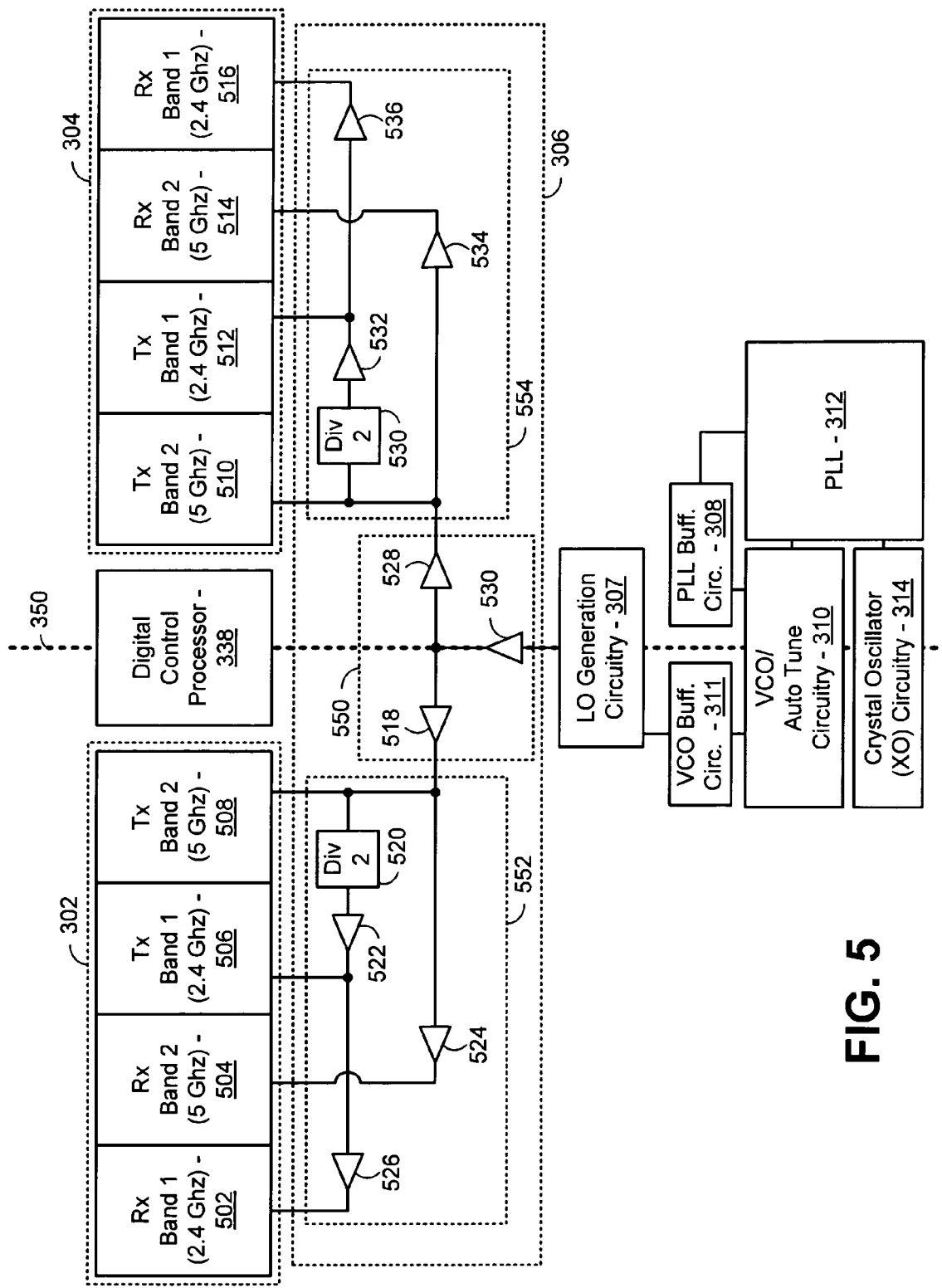
FIG. 5 is a schematic block diagram illustrating a portion of the RF transceiver IC of FIG. 4 in accordance with one embodiment of the present invention.

FIG. 5 is a schematic block diagram illustrating a portion of the RF transceiver IC of FIG. 4 in accordance with one embodiment of the present invention. With the portion of the RF transceiver FIG. 5, the first RF transceiver group 302 includes a first RF band transmitter 506, a first RF band receiver 502, a second RF band transmitter 508, and a second RF band receiver 504. Likewise, the second transceiver group 304 includes a first RF band transmitter 512, a first RF band receiver 516, a second RF band transmitter 510, and a second RF band receiver 514. According to the particular embodiment of FIG. 5, the second RF band is the 5 GHz band while the first RF band is the 2.4 GHz band. As the reader will appreciate, wireless local area network (WLAN) RF transceivers are now called upon to operate in both the 5 GHz band and the 2.4 GHz band. Thus, the RF transceiver IC 300 of the present invention supports communications in each of these bands using respective transmitters and receivers for each band.

As is illustrated in FIG. 5, the first RF band transmitter 506 of the first transceiver group 302 resides in substantial symmetry with the first RF band transmitter 512 of the second transceiver group 304 about the center line of symmetry 350 of the RF transceiver IC 300. Further, the second RF band transmitter 508 of the first transceiver group 302 resides in substantial symmetry with the second RF band transmitter 510 of the second transceiver group 304 about the center line of symmetry 350 of the RF transceiver IC. Moreover, the first RF band receiver 502 of the first transceiver group 302 resides in substantial symmetry with the first RF band receiver 516 of the second transceiver group 304 about the center line of symmetry 350 of RF transceiver IC 300. Finally, the second RF band receiver 504 of the first RF transceiver group 302 resides in substantial symmetry with the second RF band receiver 514 of the second RF transceiver group 304 about the center line of symmetry 350 of the RF transceiver IC 300.

With the construct of FIG. 5, a sequential order of position of the first RF transceiver group 302 components from the center line of symmetry 350 of the RF transceiver IC 300 is the second RF band transmitter 508, the first RF band transmitter 506, the second RF band receiver 504, and the first RF band receiver 502. Further, a sequential order of position of the second RF transceiver group 304 components from the center line of symmetry 350 of the RF transceiver IC 300 is the second RF band transmitter 510, the first RF band transmitter 512, the second RF band receiver 514, and the first RF band receiver 516. With this construct, the transmitter/receiver pairs in a common band are not adjacent to one another. This provides spatial separation between these components to reduce coupling of Tx/Rx signals from a transmitter to a receiver in the common band. However, such a construct causes the local oscillation distribution to be slightly more complicated as contrasted to the structure of FIG. 6 which will be described further herein.

Further shown in FIG. 5 are the crystal oscillator 314, the VCO/auto tune circuitry 310, the VCO buffering circuitry 311, the PLL 312, the PLL buffering circuitry 308, the local oscillation generation circuitry 307, and the local oscillation distribution circuitry 306. According to another aspect to the present invention, the local oscillation generation circuitry 307 is operable to produce a local oscillation at its output. Further, the local oscillation distribution circuitry 306 operably couples to the local oscillation generation circuitry 307, to the first RF transceiver group 302, and to the second RF transceiver group 304. The local oscillation distribution circuitry 306 includes a splitting circuit 550 that is operable to receive the local oscillation from the local oscillation generation circuitry 307 and to produce multiple copies of the local oscillation. In particular, the splitting circuit 550 includes drivers 518, 528, and 530. The input to of driver 530 is the local oscillation produced by the local oscillation generation circuitry 307. Further, each of drivers 518 and 528 produces a copy of the local oscillation that is received by driver 530. As is shown, the splitting circuit 550 and the local oscillation generation circuitry 307 reside substantially along the center line of symmetry 350 of the RF transceiver IC 300.

The local oscillation distribution circuitry 306 further includes a first distribution portion 552 that couples to the splitting circuit 550 and that is operable to produce a first local oscillation corresponding to the first RF band based upon local oscillation, to produce a second local oscillation corresponding to the second RF band based upon the local oscillation, and to provide both the first local oscillation and the second local oscillation to the first RF transceiver group 302. Likewise, the second distribution portion 554 couples to the splitting circuit 550 and is operable to produce both a first local oscillation corresponding to the first RF band based upon local oscillation and a second local oscillation corresponding to the second RF band based upon the local oscillation. Further, the second distribution portion 554 is operable to provide the first local oscillation and the second local oscillation to the second RF transceiver group 304. By locating the local oscillation generation circuitry 307 and the splitting circuitry 550 substantially along the center line of symmetry 350 of the RF transceiver IC 300, and by constructing the splitting circuit 550 with substantial symmetry about the center line of symmetry 350 of the RF transceiver IC 300, multiple copies of the local oscillation are phase matched upon their receipt by each of the first distribution portion 552 and the second distribution portion 554.

As is shown, the components of the first distribution portion 552 and the second distribution portion 554 include drivers and divide-by-two elements. In particular, the first distribution portion 552 includes divide-by-two element 520 and drivers 522, 524 and 526. Further, the second distribution portion 554 includes divide-by-two element 530 and drivers 532, 534, and 536. As is illustrated, the components of the first distribution portion 552 and the second distribution portion 554 reside in substantial symmetry with one another about the center line of symmetry 350 of the RF transceiver IC 300. Because both the first RF transceiver group 302 components and the second RF transceiver group 304 components also reside in substantial symmetry about the center line of symmetry 350 of the RF transceiver IC, distribution of both the first local oscillation and the second local oscillation to the various components of these RF transceiver groups 302 and 304 are time and phase aligned.

Figure 6:
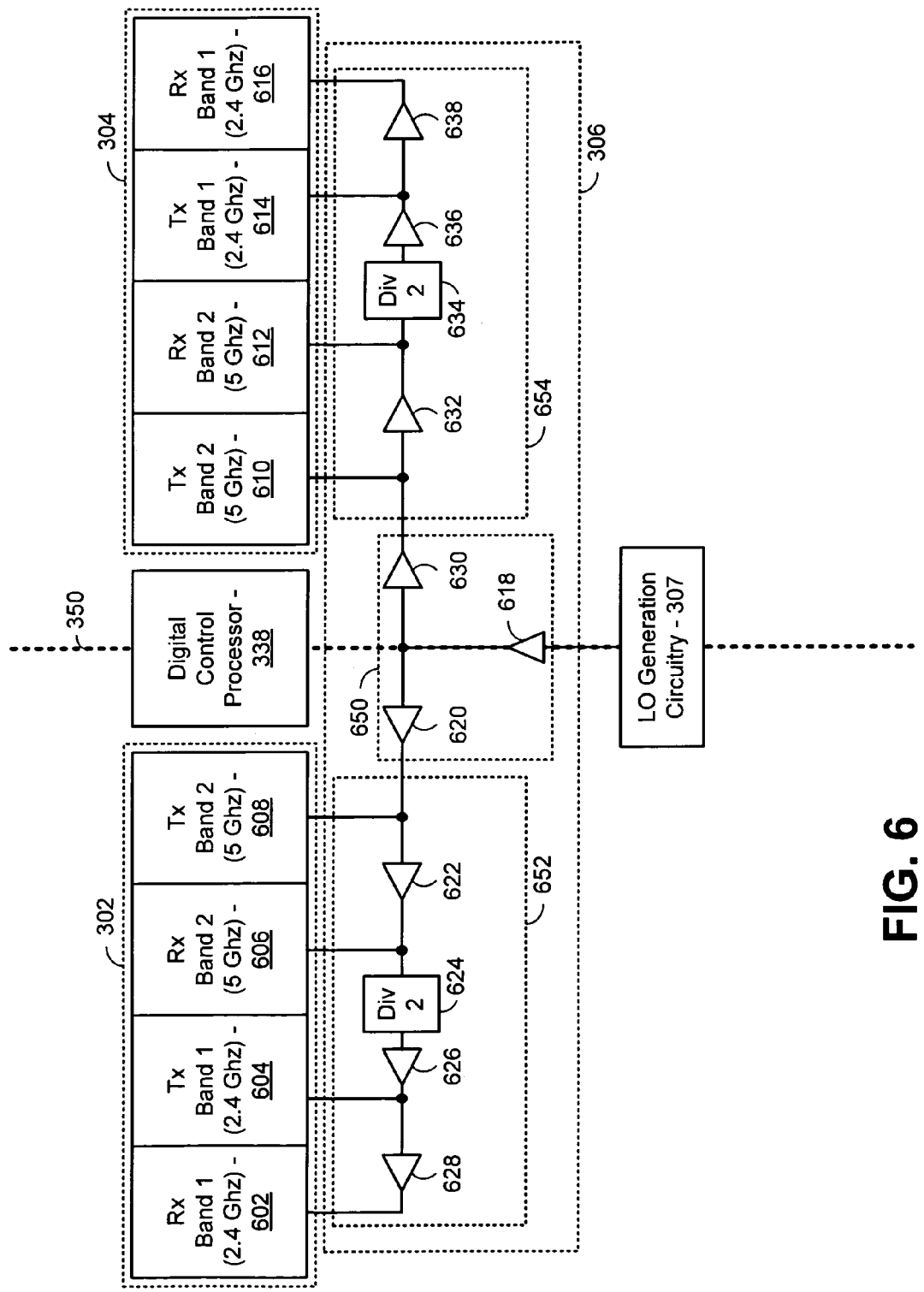
FIG. 6 is a schematic block diagram illustrating a portion of the RF transceiver IC of FIG. 4 in accordance with another embodiment of the present invention.

FIG. 6 is a schematic block diagram illustrating a portion of the RF transceiver IC of FIG. 4 in accordance with another embodiment of the present invention. With the alternate embodiment of FIG. 6, the location of the components of the RF transceiver group 302 and the second RF transceiver group 304 differ from the locations of corresponding components of FIG. 5. FIG. 6 does not include components of the local oscillation circuitry other than the LO generation circuitry 307 and the LO distribution circuitry 306. Of course, the reader will appreciate that the components are not shown for simplicity purposes but are required in the full construct of the RF transceiver IC 300.

With the embodiment of FIG. 6, a sequential order of position of the first RF transceiver group 302 components from the center line of symmetry 350 of the RF transceiver IC 300 is the second RF band transmitter 608, the second RF band receiver 606, the first RF band transmitter, and the first RF band receiver 602. Likewise, a sequential order of position from the center line of symmetry 350 of the RF transceiver IC of the components of the second RF transceiver group 304 is the second RF band transmitter 610, the second RF band receiver 614, the first RF band transmitter 614, and the first RF band receiver 616. As contrasted to the structure of FIG. 6, the transmitter and receiver pairs operating in a common band are adjacent one another instead of being separated by an intervening component.

While the structure may result in additional coupling of a transmit signal to its adjacent common RF band receiver, the structure allows a reduced complexity of local oscillation distribution circuitry 306 to be employed. As is shown, the local oscillation splitting circuit 650 includes drivers 618, 620 and 630. The structure of the splitting circuit 650 may be identical to that of the splitting circuit 550 of FIG. 5. The splitting circuit 650 preferably resides along the center line of symmetry 350 of the RF transceiver IC 300. Further, the drivers 620 and 630 may be symmetrically located about the center line of symmetry 350 of the RF transceiver IC 300. The first distribution portion 652 includes drivers 622, divide-by-two element 624, driver 626, and driver 628. The second distribution portion 654 includes driver 632, divide-by-two element 634, driver 636, and driver 638. As contrasted to the structure of the splitting circuit 552 of FIG. 5, the structure of the splitting circuit 652 of FIG. 6 is less complicated, may consume less power, and may require less floor space for construction and routing.

Figure 7:
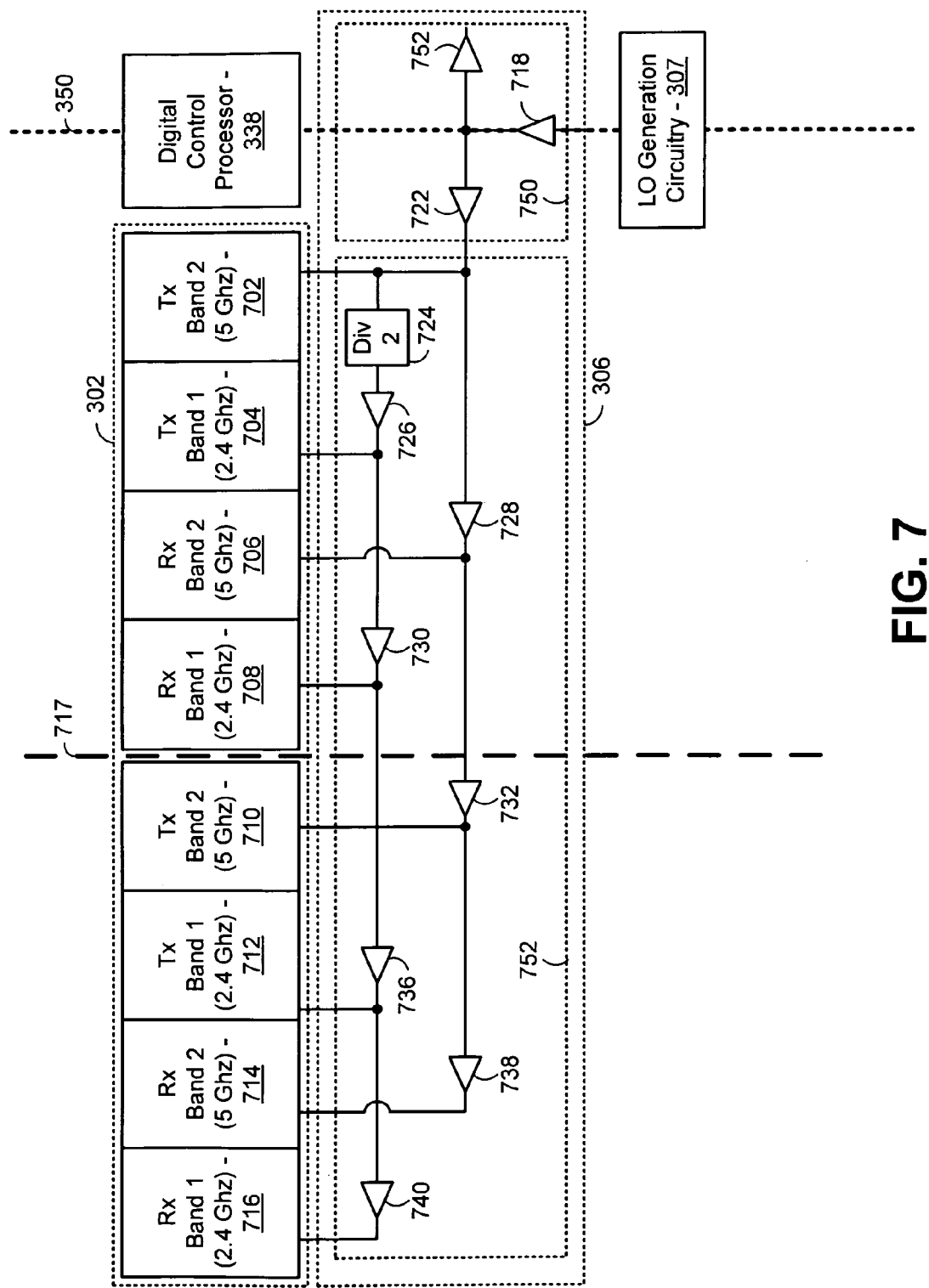
FIG. 7 is a schematic block diagram illustrating a portion of an RF transceiver IC or multiple RF transceiver ICs in accordance with still another embodiment of the present invention.

FIG. 7 is a schematic block diagram illustrating a portion of an RF transceiver IC or multiple RF transceiver ICs in accordance with still another embodiment of the present invention. In particular, FIG. 7 illustrates how the structure of a first RF transceiver group 302 may be expanded to include additional RF receivers and RF transmitters. The structure of FIG. 7 is similar to the structure of FIG. 5 with regard to the orientation of RF transmitters and RF receivers in the two RF bands. In such case, the first RF transceiver group 302 includes a second RF band transmitter 702, a first RF band transmitter 704, a RF second band receiver 706, a first RF band receiver 708, second RF band transmitter 710, a first RF band transmitter 712, a second RF band receiver 714, and a first RF band receiver 716. The components of the first RF transceiver group 302 may be present on a single RF transceiver IC, with line 717 separating a left slice (elements to the left of line 717) and a right slice (elements to the right of line 717). Alternatively, these components may be on separate RF transceiver ICs with the separation between the ICs along line 717. With the structure of FIG. 7 extended to a second RF transceiver group, complimentary and corresponding transmitter and receiver components of the second RF transceiver group may be included. The structure of the first RF transceiver group 302 and the second RF transceiver group (not shown) may be substantially symmetric about the center line of symmetry 350 of the RF transceiver IC 300.

The local oscillation distribution circuitry includes the splitting circuits 750 and a first distribution portion 752. In such case, the splitting circuit 750 includes drivers 718, 720, and 722. The first distribution portion 752 includes divide-by-two element 724 and drivers 726, 728, 730, 732, 736, 738, and 740. When the first RF transceiver group 302 resides on a single RF transceiver IC, all of the elements of the first distribution portion 752 reside on the single RF transceiver IC. However, if the components of the first RF transceiver group 302 extend across multiple ICs, the components of the first distribution portion 752 will reside upon multiple RF transceiver ICs with separation at line 716.

Figure 8:
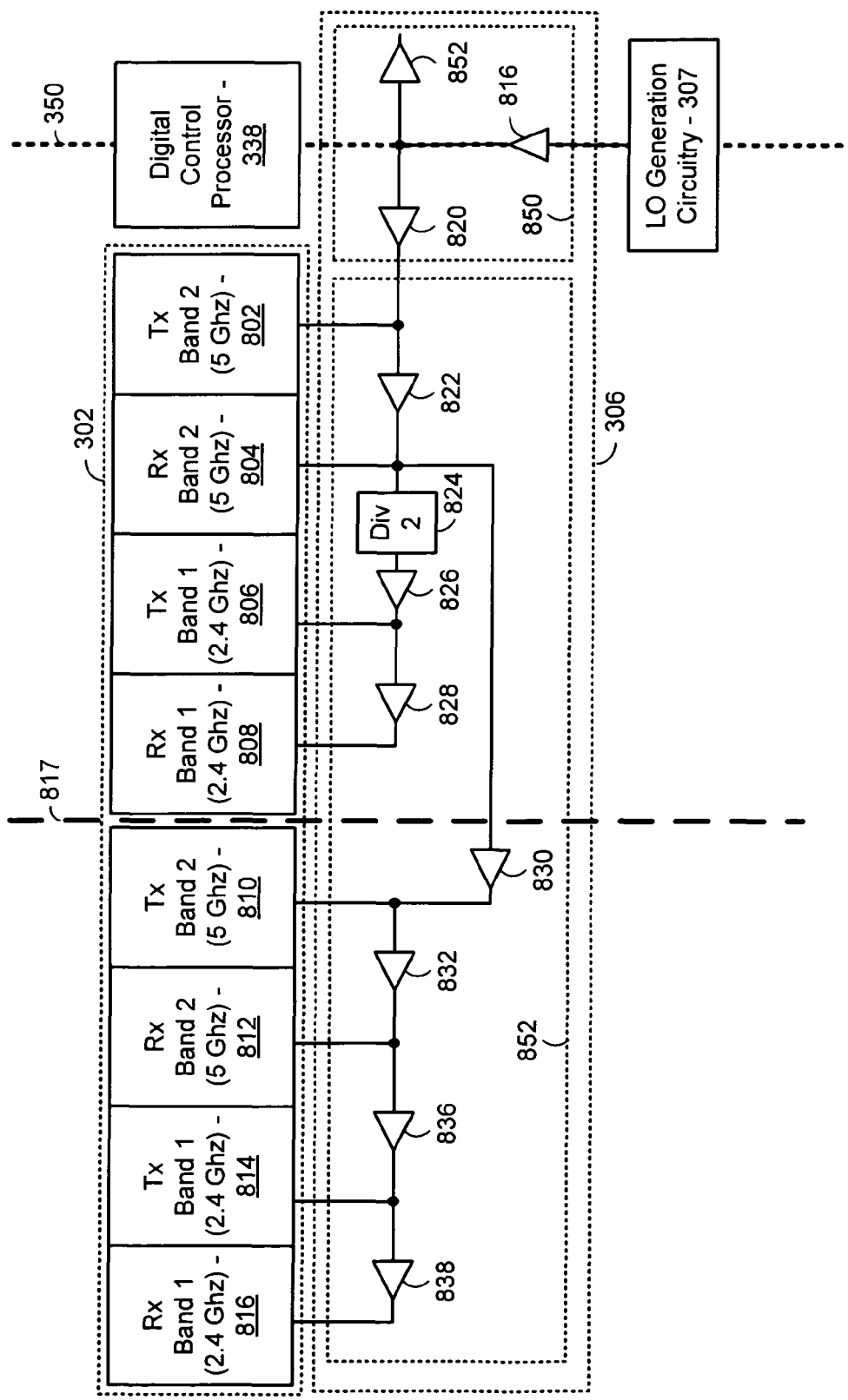
FIG. 8 is a schematic block diagram illustrating a portion of an RF transceiver IC or multiple RF transceiver ICs in accordance with yet another embodiment of the present invention.

FIG. 8 is a schematic block diagram illustrating a portion of an RF transceiver IC or multiple RF transceiver ICs in accordance with yet another embodiment of the present invention. The structure of FIG. 8 may reside on a single RF transceiver IC or upon multiple RF transceiver ICs and generally corresponds to the structure of FIG. 6. When the structure of FIG. 8 resides on a single RF transceiver IC, all of the components of the first RF transceiver group 302 reside upon the single RF transceiver IC with line 817 separating a left slice from a right slice. However, when the components illustrated in FIG. 8 reside on multiple RF transceiver ICs (e.g., along dividing line 817), some of the components of the first RF transceiver group 302 and distribution portion 852 reside on a first RF transceiver IC while other components of the first RF transceiver group 302 and distribution portion 852 reside on a second RF transceiver IC.

In the construct of FIG. 8, a different ordering of the Tx and Rx blocks of the first RF transceiver group 302 is shown. In such case, the first RF transceiver group 302 includes a second RF band transmitter 802, a second RF band receiver 804, a first RF band transmitter 806, a first RF band receiver 808, a second RF band transmitter 810, a second RF band receiver 812, a first RF band transmitter 814, and a first RF band receiver 816. Also shown in FIG. 8 are local oscillation generation circuitry 307 and local oscillation distribution circuitry 306. The local oscillation distribution circuitry 306 corresponding to the first RF transceiver group 302 includes splitting circuit 850 and first distribution portion 852. The splitting circuit 850 includes drivers 816, 820, 852. The first distribution portion 852 includes drivers 822, 826, 830, 832, 836, and 838. The first distribution portion 852 also includes divide by 2 element 824. Of course, since the components shown in FIG. 8 correspond to only one-half of an RF transceiver, a second distribution portion (not shown) would reside substantially symmetric about the center line of symmetry at 350 of the RF transceiver IC.

Figure 9:
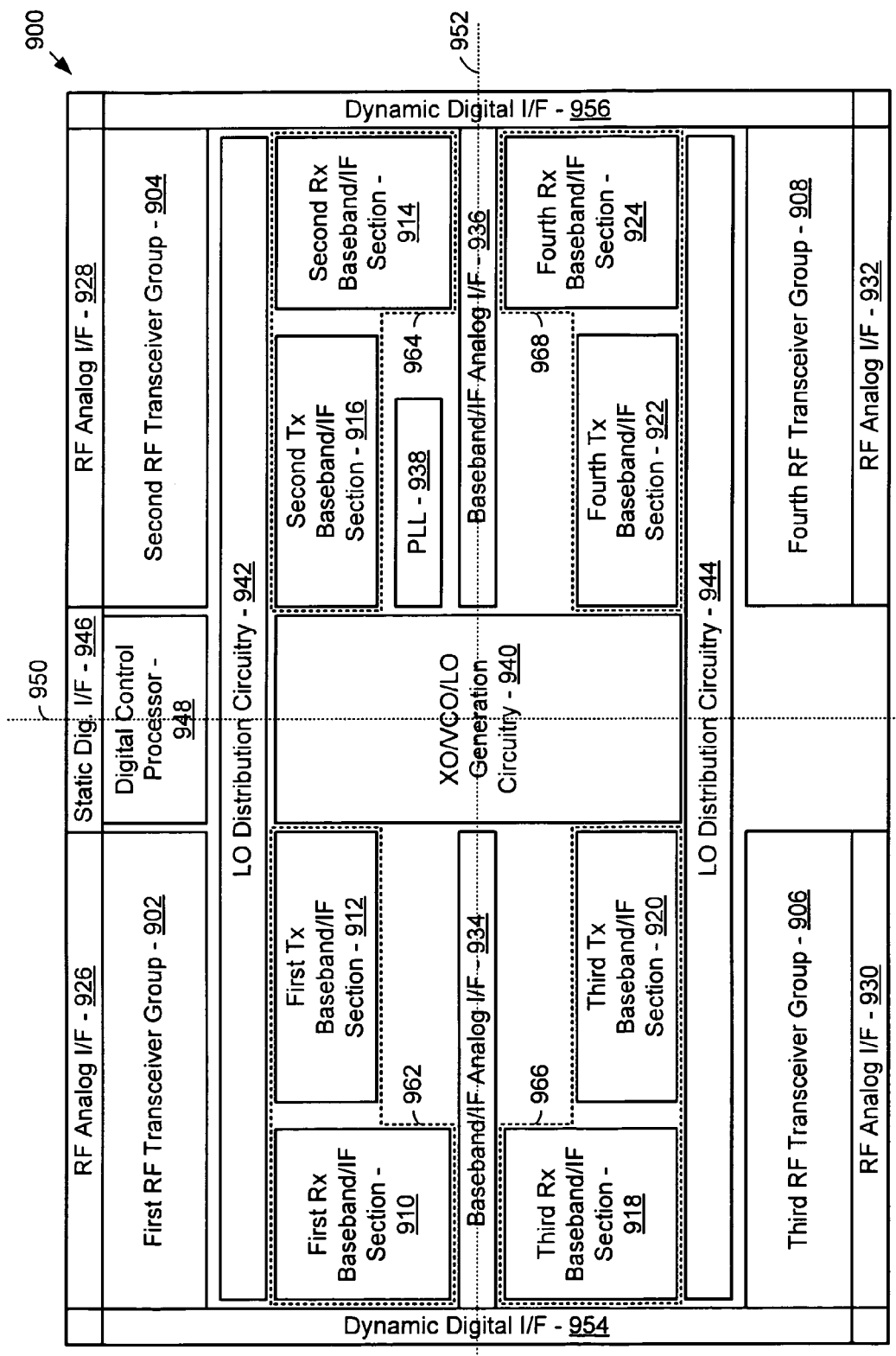
FIG. 9 is a schematic block diagram illustrating another RF transceiver IC in accordance with an embodiment of the present invention.

FIG. 9 is a schematic block diagram illustrating another RF transceiver IC in accordance with an embodiment of the present invention. The RF transceiver IC illustrated in FIG. 9 extends the principles previously described with reference to FIGS. 4-8. The RF transceiver IC 900 includes a first RF transceiver group 902, a second RF transceiver group 904, a third RF transceiver group 906, and a fourth RF transceiver group 908. The RF transceiver IC 900 further includes a first baseband section 962, a second baseband section 964, a third baseband section 966, and a fourth baseband section 968. The first baseband section 962 includes a first receive baseband section 910 and a first transmit baseband section 912. The second baseband section 964 includes a second transmit baseband section 916 and a second receive baseband section 914. The third baseband section 966 includes a third receive baseband section 918 and a third transmit baseband section 920. The fourth baseband section 968 includes a fourth transmit baseband section 922 and a fourth receive baseband section 924.

The RF transceiver IC 900 of FIG. 9 includes XO/VCO/LO circuitry referred to jointly as local oscillation generation circuitry 940. The RF transceiver IC 900 further includes local oscillation distribution circuitry 942 and local oscillation distribution circuitry 944. Local oscillation distribution circuitry 942 services the first RF transceiver group 902 and the second RF transceiver group 904. Local oscillation distribution circuitry 944 services the third RF transceiver group 906 and the fourth RF transceiver group 908. Further shown is PLL 938 that operates in conjunction with the local oscillation generation circuitry 940 to produce at least one local oscillation.

The input and output structure of the RF transceiver IC 900 includes RF analog interfaces 926, 928, 930, and 932 which service the first RF transceiver group 902, the second RF transceiver group 904, the third RF transceiver group 906, and the fourth RF transceiver group 908, respectively. Further included are static digital interface 946, and dynamic digital interfaces 954 and 956. Baseband/IF analog interfaces 934 and 936 service the baseband sections 962, 964, 966, and 968 of the RF transceiver IC 900. Because the baseband/IF analog interfaces 934 and 936 do not reside along an edge of the RF transceiver IC 900, standard bonding techniques may not be employed. Thus, with this construct, a non-standard lead termination and packaging technique would be employed.

Shown in FIG. 9 are various symmetrical relationships of the components of the RF transceiver IC 900. According to one aspect of the teachings of FIG. 9, the second RF transceiver group 904 resides in substantial symmetry with the first RF transceiver group 902 about a first center line of symmetry 950 of the RF transceiver IC 900. According to another aspect, the third RF transceiver group 906 resides in substantial symmetry with the first RF transceiver group 902 about a second center line at symmetry 952 of the RF transceiver IC 900. The second center line of symmetry 952 of the RF transceiver IC 900 may be substantially perpendicular to the first center line of symmetry 950 of the RF transceiver IC 900.

According to another aspect of the teachings of FIG. 9, the fourth RF transceiver group 908 resides in substantial symmetry with the third RF transceiver group 906 about the first center line of symmetry 950 of the RF transceiver IC 900. Further, the fourth RF transceiver group 908 resides in substantial symmetry with the second RF transceiver group 904 about the second center line of symmetry 952 of the RF transceiver IC 900.

According to other symmetrical relationships of the structure of FIG. 9, the second baseband section 964 resides in substantial symmetry with the first baseband section 962 about the first center line of symmetry 950 of the RF transceiver IC 900. According to another symmetrical aspect of the structure of FIG. 9, the fourth baseband section 968 resides in substantial symmetry with the third baseband section 966 about the first center line of symmetry 950 of the RF transceiver IC 900. Further, the third baseband section 966 resides in substantial symmetry with the first baseband section 962 about the second center line of symmetry 952 of the RF transceiver IC 900. Finally, the fourth baseband section 968 resides in substantial symmetry with the second baseband section 964 about the second center line of symmetry 952 of the RF transceiver IC 900. Such symmetrical relationships of the baseband sections extend to the component may extend to the components of the baseband sections such that the various components of the baseband section would have symmetry as well.

Figure 10:
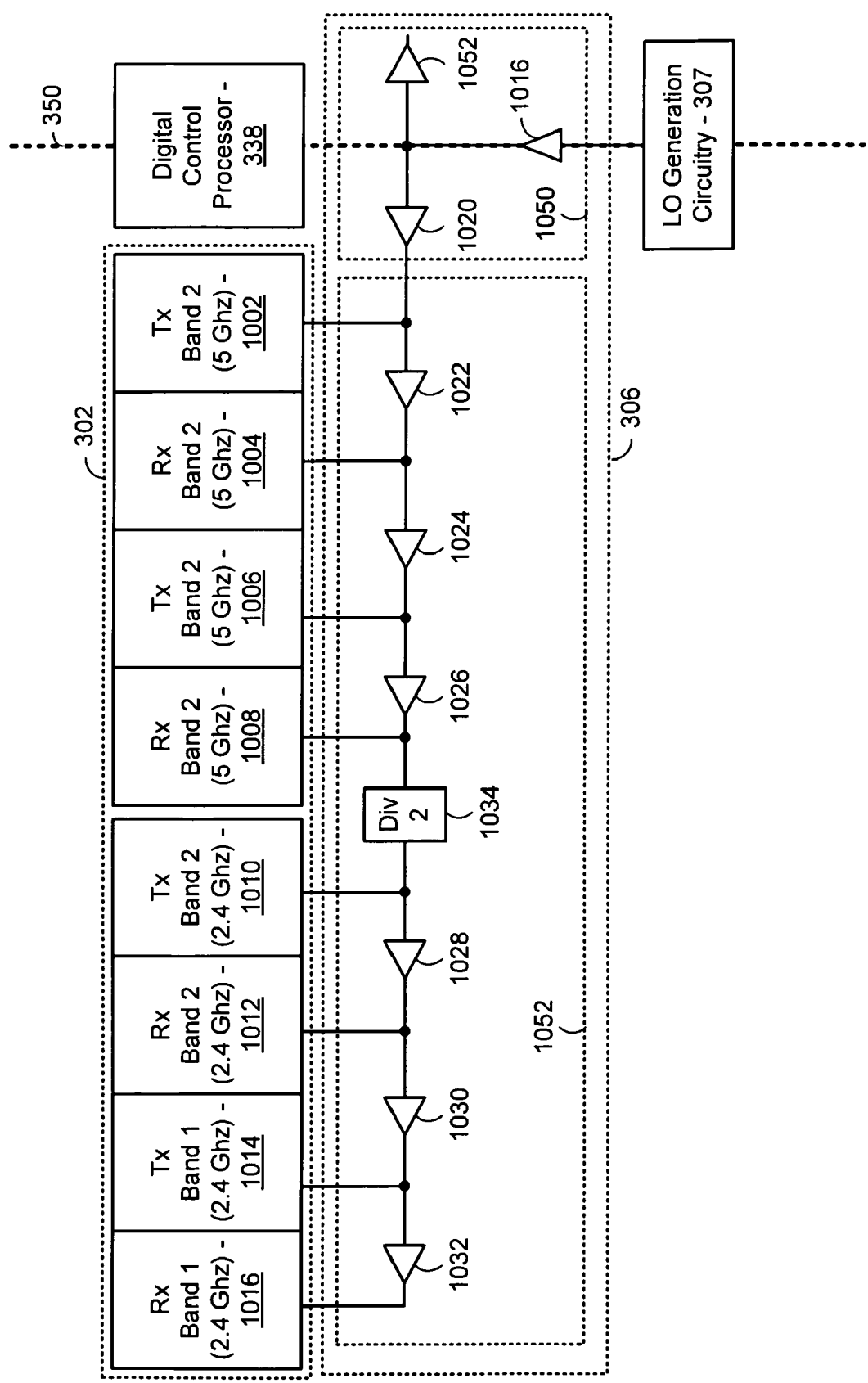
FIG. 10 is a schematic block diagram illustrating a portion of an RF transceiver IC or multiple.

FIG. 10 is a schematic block diagram illustrating a portion of an RF transceiver IC or multiple RF transceiver ICs in accordance with still another embodiment of the present invention. The structure of FIG. 10 may reside on a single RF transceiver IC or upon multiple RF transceiver ICs and generally corresponds to the structure of FIG. 6. In the construct of FIG. 10, a different ordering of the Tx and Rx blocks of the first RF transceiver group 302 is shown. In such case, the first RF transceiver group 302 includes a second RF band transmitter 1002, a second RF band receiver 1004, a second RF band transmitter 1006, a second RF band receiver 1008, a first RF band transmitter 1010, a first RF band receiver 1012, a first RF band transmitter 1014, and a first RF band receiver 1016. Also shown in FIG. 10 are local oscillation generation circuitry 307 and local oscillation distribution circuitry 306. The local oscillation distribution circuitry 306 corresponding to the first RF transceiver group 302 includes splitting circuit 1050 and first distribution portion 1052. The splitting circuit 1050 includes drivers 1016, 1020, and 1052. The first distribution portion 1052 includes drivers 1022, 1024, 1026, 1028, 1030, and 1032. The first distribution portion 1052 also includes divide by 2 element 1034. Of course, since the components shown in FIG. 10 correspond to only one-half of an RF transceiver, a second distribution portion (not shown) would reside substantially symmetric about the center line of symmetry 350 of the RF transceiver IC.

As one of ordinary skill in the art will appreciate, the term "substantially" or "approximately," as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled." As one of ordinary skill in the art will further appreciate, the term "compares favorably," as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented a phase locked loop with power distribution that reduces noise generated by the phase locked loop. By reducing noise within the phase locked loop, the phase locked loop may be used within a local oscillation generator to reduce noise therein. As one of ordinary skill in the art will appreciate, other embodiments may be derived from the teaching of the present invention without deviating from the scope of the claims.

The invention claimed is:

1. A Radio Frequency (RF) transceiver Integrated Circuit (IC) comprising:
   a first RF transceiver module that is operable to service communications within at least one RF band;
   a second RF transceiver module that is operable to service the communications within the at least one RF band, wherein the second RF transceiver module resides in substantial symmetry with the first RF transceiver module;
   local oscillation generation circuitry operable to produce a local oscillation; and
   local oscillation distribution circuitry coupled to the local oscillation generation circuitry, to the first RF transceiver module, and to the second RF transceiver module, the local oscillation distribution circuitry including:
      splitting circuitry operable to receive the local oscillation from the local oscillation generation circuitry and to produce multiple phase matched copies of the local oscillation;
      a first distribution portion coupled to the splitting circuitry and operable to produce a first local oscillation corresponding to the at least one RF band based upon the local oscillation and to provide the first local oscillation to the first RF transceiver module; and
      a second distribution portion coupled to the splitting circuitry and operable to produce a second local oscillation corresponding to the at least one RF band based upon the local oscillation and to provide the second local oscillation.

2. The RF transceiver IC of claim 1, wherein the local oscillation generation circuitry resides substantially along a center line of symmetry of the RF transceiver IC.

3. The RF transceiver IC of claim 1, wherein the splitting circuitry of the local oscillation distribution circuitry resides substantially along a center line of symmetry of the RF transceiver IC.

4. The RF transceiver IC of claim 1, wherein the first distribution portion and the second distribution portion of the local oscillation distribution circuitry reside in substantial symmetry about a center line of symmetry of the RF transceiver IC.

5. The RF transceiver IC of claim 1, further comprising:
   a first baseband section having a first Rx baseband section and a first Tx baseband section;
   a second baseband section having a second Rx baseband section and a second Tx baseband section; and
   wherein the first baseband section and the second baseband section reside in substantial symmetry about a center line of symmetry of the RF transceiver IC.

6. The RF transceiver IC of claim 1, wherein:
   the first RF transceiver module includes a first RF band transmitter, a first RF band receiver, a second RF band transmitter, and a second RF band receiver; and
   the second RF transceiver module includes a first RF band transmitter, a first RF band receiver, a second RF band transmitter, and a second RF band receiver.

7. The RF transceiver IC of claim 6, wherein:
   the first RF band transmitter of the first RF transceiver module resides in substantial symmetry with the first RF band transmitter of the second RF transceiver module about a center line of symmetry of the RF transceiver IC;
   the second RF band transmitter of the first RF transceiver module resides in substantial symmetry with the second RF band transmitter of the second RF transceiver module about the center line of symmetry of the RF transceiver IC;
   the first RF band receiver of the first RF transceiver module resides in substantial symmetry with the first RF band receiver of the second RF transceiver module about the center line of symmetry of the RF transceiver IC; and
   the second RF band receiver of the first RF transceiver module resides in substantial symmetry with the second RF band receiver of the second RF transceiver module about the center line of symmetry of the RF transceiver IC.

8. The RF transceiver IC of claim 7, wherein:
   a sequential order of position of first RF transceiver module components from the center line of symmetry of the RF transceiver IC is the second RF band transmitter, the first RF band transmitter, the second RF band receiver, and the first RF band receiver; and
   a sequential order of position of second RF transceiver module components from the center line of symmetry of the RF transceiver integrated circuit is the second RF band transmitter, the first RF band transmitter, the second RF band receiver, and the first RF band receiver.

9. The RF transceiver IC of claim 7, wherein:
   a sequential order of position of first transceiver group components from the center line of symmetry of the RF transceiver IC is the second RF band transmitter, the second RF band receiver, the first RF band transmitter, and the first RF band receiver; and
   a sequential order of position from the center line of symmetry of the RF transceiver integrated circuit of second transceiver group components is the second RF band transmitter, the second RF band receiver, the first RF band transmitter, and the first RF band receiver.

10. The RF transceiver IC of claim 1, wherein:
the first distribution portion of the local oscillation distribution circuitry resides between a first baseband section and the first RF transceiver module; and
the second distribution portion of the local oscillation distribution circuitry further resides between a second baseband section and the second RF transceiver module.

11. The RF transceiver IC of claim 1, wherein:
the first RF transceiver module includes a first RF band transmitter and a first RF band receiver; and
the second RF transceiver module includes a first RF band transmitter and a first RF band receiver.

12. A Radio Frequency (RF) transceiver Integrated Circuit (IC) comprising:
a first RF transceiver module that is operable to service communications within at least one RF band;
a second RF transceiver module that is operable to service the communications within the at least one RF band, wherein the second RF transceiver module resides in substantial symmetry with the first RF transceiver module;
local oscillation generation circuitry operable to produce a local oscillation;
local oscillation splitting circuitry coupled to the local oscillation generation circuitry and operable to receive the local oscillation from the local oscillation generation circuitry and to produce multiple phase matched copies of the local oscillation, the local oscillation splitting circuitry residing substantially along a center line of symmetry of the RF transceiver IC; and
local oscillation distribution circuitry coupled to the local oscillation splitting circuitry and operable to couple a first local oscillation received from the local oscillation splitting circuitry to the first RF transceiver module and operable to couple a second local oscillation received from the local oscillation splitting circuitry to the second RF transceiver module.

13. The RF transceiver IC of claim 12, wherein the local oscillation distribution circuitry comprises:
first local oscillation distribution circuitry operable to couple the first local oscillation received from the local oscillation splitting circuitry to the first RF transceiver module;
second local oscillation distribution circuitry operable to couple the second local oscillation received from the local oscillation splitting circuitry to the second RF transceiver module; and
wherein the first local oscillation distribution circuitry and the second local oscillation distribution circuitry reside in substantial symmetry about a center line of symmetry of the RF transceiver IC.

14. The RF transceiver IC of claim 12, wherein the local oscillation generation circuitry resides substantially along a center line of symmetry of the RF transceiver IC.

15. The RF transceiver IC of claim 12, wherein the local oscillation splitting circuitry resides substantially along a center line of symmetry of the RF transceiver IC.

16. The RF transceiver IC of claim 12, further comprising:
a first baseband section coupled to the first RF transceiver module;
a second baseband section coupled to the second RF transceiver module; and
wherein the first baseband section and the second baseband section reside in substantial symmetry about a center line of symmetry of the RF transceiver IC.

17. The RF transceiver IC of claim 12, wherein:
a first portion of the local oscillation distribution circuitry resides between the first baseband section and the first RF transceiver module; and
a second portion of the local oscillation distribution circuitry resides between the second baseband section and the second RF transceiver module.

18. The RF transceiver IC of claim 12, wherein:
the first RF transceiver module includes a first RF band transmitter, a first RF band receiver, a second RF band transmitter, and a second RF band receiver; and
the second RF transceiver module includes a first RF band transmitter, a first RF band receiver, a second RF band transmitter, and a second RF band receiver.

19. The RF transceiver IC of claim 12, wherein:
the first RF transceiver module includes a first RF band transmitter and a first RF band receiver; and
the second RF transceiver module includes a first RF band transmitter and a first RF band receiver.

* * * * *